April 30, 1957  M. A. BABB  2,790,324
HYDROGEN ALTIMETER
Filed Oct. 27, 1948

INVENTOR.
MAYNARD A. BABB
BY
Stephen Cerstvik
- ATTORNEY -

United States Patent Office 2,790,324
Patented Apr. 30, 1957

2,790,324

HYDROGEN ALTIMETER

Maynard A. Babb, Englewood, N. J., assignor to Bendix Aviation Corporation, Teterboro, N. J., a corporation of Delaware Application October 27, 1948, Serial No. 56,773

9 Claims. (Cl. 73—384)

The present invention relates to pressure responsive devices, and more particularly to a novel electric altimeter having a range of operation above the troposphere.

In accordance with the invention, novel means are provided whereby altitude is measured by the pressure of hydrogen at different altitude levels.

The device embodying the invention is particularly, but not exclusively, adapted for use on aircraft and the like.

Altimeters used heretofore have been almost exclusively of the diaphragm or aneroid type, and, although quite satisfactory under many conditions, such altimeters have been subject to errors due to excessive lag in the mechanism and were also affected by acceleration and deceleration of the craft, so that their accuracy has been limited, especially at high altitudes. Moreover, such altimeters have been rendered unreliable and practically useless at altitudes above the troposphere.

One of the objects of the invention, therefore, is to provide a novel altimeter free from the foregoing undesirable characteristics.

Another object is to provide a novel altimeter of the electrical type embodying novel means for producing an electrical current which is a function of the altitude of the craft.

Still another object is to provide a novel electrical altimeter embodying novel means whereby the change in the resistance of a wire is dependent upon the changes in pressure in an evacuated chamber due to changes in altitude.

Still another object is to provide a novel combination in an electrical altimeter, comprising a balanced Wheatstone bridge and means for producing an unbalancing current, the magnitude of which is a function of the altitude.

Still another object of the invention is to provide a novel altitude measuring device utilizing the partial pressure of hydrogen in the atmosphere to produce an indication of the position of an aircraft above sea-level.

Another object of the invention is to provide a novel altitude measuring device which may be installed at any point on the craft, and the values of altitude read remotely at any other desired point or plurality of points on the craft.

While two embodiments of the invention have been shown and described as applied to an altitude indicating apparatus, it will be apparent that the invention may be readily and advantageously used to measure the partial pressure of hydrogen under any condition.

The foregoing and other objects and advantages of the invention will appear more fully hereinafter from a consideration of the detailed description which follows, taken together with the accompanying drawing wherein two embodiments of the invention are illustrated by way of example. It is to be expressly understood, however, that the drawing is for purposes of illustration and description only, and is not to be construed as defining the limits of the invention, reference being had to the appended claims for this purpose.

In the drawing, wherein like reference numerals refer to like parts:

Inasmuch as one of the most sensitive and reliable methods of measuring resistances, or indicating changes in resistance, is the Wheatstone bridge circuit, use is made of such a circuit in one embodiment of the invention.

Figure 1:
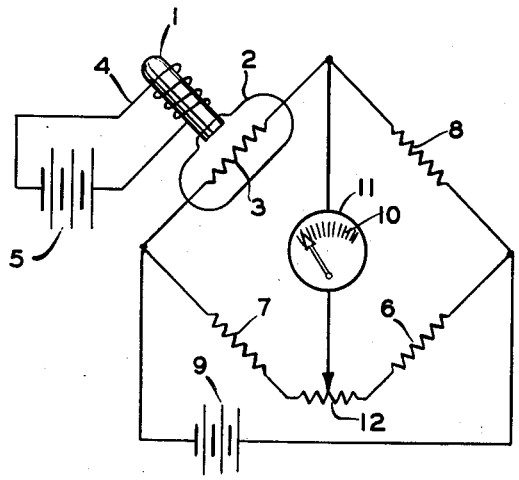
Figure 1 is a circuit diagram of one embodiment of the invention.

Referring now to the drawing and particularly to Figure 1, the numeral 1 designates a palladium chamber which is inserted into and forms part of an evacuated tube 2. A wire 3 is contained within the tube 2 and is connected exteriorly to a Wheatstone bridge circuit. A heating coil 4 is disposed about the palladium chamber, and is operatively connected to a source of electrical potential 5. The wire 3 together with resistances 6, 7 and 8 form a Wheatstone bridge energized by an electrical potential source 9. The dial 10 on meter 11 is marked in units of altitude. The meter 11 is connected across one diagonal of the bridge and is set for airfield altitude by means of a balancing resistance 12.

It has been found that the metals of the platinum group such as palladium, platinum, iridium, ruthenium, osmium, and rhodium possess the property, when heated, of permitting the passage therethrough of hydrogen gas only. Palladium, however, appears to be more adaptable to the purpose because of its greater ability to resist chemical attack and corrosion, and withstand elevated temperature, and further because of its high tensile strength, and because it is capable of being rolled into very thin sheets. It will therefore be seen that as the hydrogen gas from the atmosphere is permitted to pass through the heated palladium 1 the gas pressure in the tube 2 will be increased or decreased depending upon whether the hydrogen is going into or out of the tube through the heated palladium 1. It is also well known that the heat conductivity of a gas changes directly with its density. Therefore, the quantity of heat conducted from the wire 3 by the hydrogen will vary thereby changing the resistance of said wire in proportion to the density of hydrogen entering said tube 2.

Figure 3:
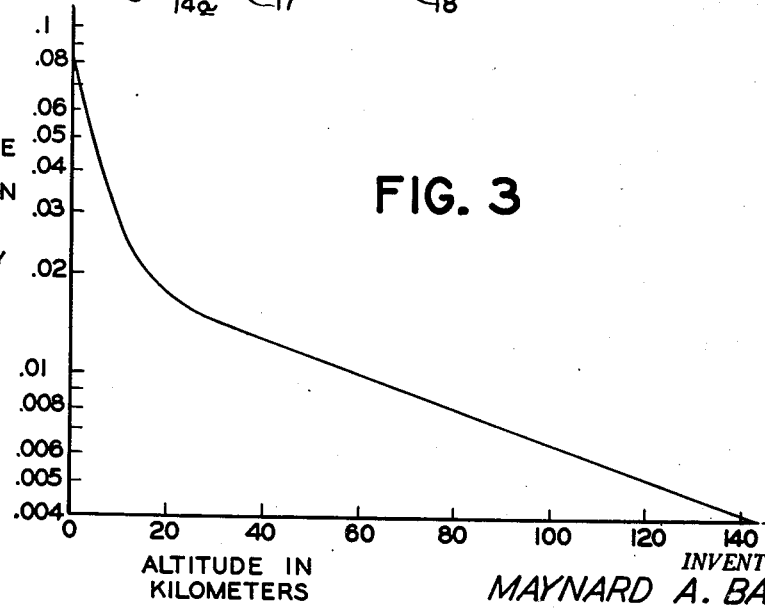
Figure 3 is a graph or curve showing the relation between altitude and the partial pressure of hydrogen gas at several different altitudes, as for example, from 0 to 140 kilometers.

The pressure of the hydrogen in the tube at any given altitude will follow the values shown on Figure 3. The magnitude of the consequent unbalance of the Wheatstone bridge may be read on dial 10 of meter 11 in units of altitude.

Figure 2:
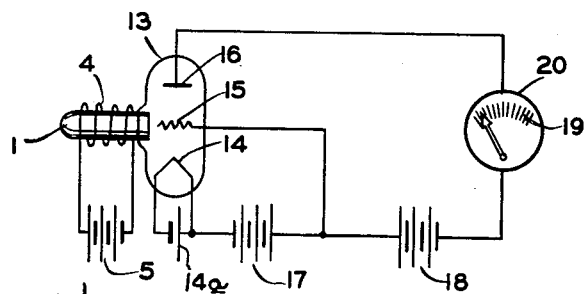
Figure 2 is a circuit diagram of another embodiment of the invention.

Referring now to Figure 2 for a second embodiment of the invention, the palladium chamber 1 forms part of, and is inserted into, an evacuated tube 13. As in the previous embodiment, the heating coil 4 is disposed about the palladium chamber 1, and is operatively connected to the source of electrical potential 5. The elements of the tube 13, filament 14, grid or accelerating electrode 15, and plate 16 are exteriorly connected to voltage sources 17 and 18. Filament 14 is heated by a voltage source 14a.

It will now be apparent that the heated palladium chamber 1 will permit only hydrogen gas to enter the tube 13. Heated filament 14 will release a stream of electrons to grid or accelerating electrode 15, and these electrons will bombard the hydrogen gas molecules thereby causing the formation of hydrogen ions which will be attracted to plate 16, thereby causing a plate current to flow. The meter 20 is disposed in the plate circuit to measure said plate current. The dial 19 on meter 20 is marked to read units of altitude. It will further be apparent, that the values measured on meter 20 are dependent on the density of the hydrogen permitted to pass through the heated palladium chamber 1 into the evacuated tube 13, and that this value will be a function of the altitude in accordance with the values shown in Fig. 3.

From the foregoing it will be apparent that there are thus provided novel means whereby altitude, as for example, the altitude of an aircraft, may be accurately measured over a wide range, by utilizing the partial pressure of the hydrogen present in the atmosphere at different altitude levels.

Although only two embodiments of the invention have been illustrated and described, other changes and modifications in the form and relative arrangement of parts, which will now appear to those skilled in the art, may be made without departing from the spirit or scope of the invention, reference being had to the appended claims for a definition of the limits of the invention.

What is claimed is:

1. An altimeter comprising a hydrogen pressure responsive device having an evacuated envelope, an insert made of a metal of the platinum group in communication with the atmosphere and the interior of said envelope, means adapted to heat said insert to permit the flow of hydrogen therethrough into and out of said envelope to thereby vary the hydrogen pressure within said envelope as a function of altitude, and means for indicating altitude in terms of the hydrogen pressure within said envelope.

2. An altimeter comprising a hydrogen pressure responsive device having an evacuated envelope, a palladium insert in communication with the atmosphere and the interior of said envelope, means adapted to heat said palladium insert to permit the flow of hydrogen therethrough into and out of said envelope to thereby balance the pressure of the hydrogen within said envelope with the pressure of hydrogen in the atmosphere and thereby vary the hydrogen pressure within said envelope as a function of altitude, a wire in said envelope, the resistance of said wire being responsive to changes in the hydrogen pressure within said envelope, the ends of said wire being adapted to be connected exteriorly of said envelope in an electrical circuit, and means for indicating altitude in terms of the hydrogen pressure within said envelope, comprising means connected in said circuit for indicating the resistance of said wire as a function of the hydrogen pressure acting thereon, said indicating means being calibrated in terms of altitude.

3. An altimeter comprising a hydrogen pressure responsive device having an evacuated envelope, an insert made of a metal of the platinum group in communication with the atmosphere and the interior of said envelope, means adapted to heat said insert to permit the flow of hydrogen therethrough into and out of said envelope to thereby vary the hydrogen pressure within said envelope as a function of altitude and balance the hydrogen pressure within said envelope with the hydrogen pressure in the atmosphere, and means for indicating altitude in terms of the hydrogen pressure within said envelope, comprising a wire in said envelope, the resistance of said wire varying with the hydrogen pressure within said envelope, the ends of said wire being adapted to be connected exteriorly of said envelope in an electrical circuit, and means connected in said circuit for indicating the resistance of said wire as a function of the hydrogen pressure acting thereon, said last means being calibrated in terms of altitude.

4. An altimeter comprising a hydrogen pressure responsive device having an evacuated envelope, a palladium insert attached to said envelope and in communication with the atmosphere and the interior of said envelope, means adapted to heat said palladium insert to permit the flow of hydrogen therethrough into and out of said envelope to thereby vary the hydrogen pressure within said envelope as a function of altitude and balance the hydrogen pressure within said envelope with the hydrogen pressure in the atmosphere, and means for indicating altitude in terms of the hydrogen pressure within said envelope, comprising a wire in said envelope adapted to be connected to an exterior circuit, the resistance of said wire being affected by the hydrogen pressure within said envelope, and means connected in said circuit for indicating the change in resistance of said wire as a function of the hydrogen pressure in said envelope, said indicating means being calibrated in terms of altitude.

5. An altimeter comprising an evacuated tube envelope, a palladium insert in communication with the atmosphere and the interior of said tube envelope and forming a part of said tube, means adapted to heat said palladium insert to permit the flow of hydrogen therethrough into and out of said tube envelope to thereby balance the internal hydrogen pressure of said tube envelope with the hydrogen pressure of the atmosphere surrounding said tube envelope and thereby vary the hydrogen pressure within said envelope as a function of altitude, and means for indicating altitude in terms of the hydrogen pressure within said envelope, comprising said tube to thereby balance the internal hydrogen pressure of said tube with the hydrogen pressure of the atmosphere surrounding said tube, a wire within said tube adapted to be connected to an exterior bridge circuit, said bridge circuit including three fixed resistors forming three arms of said bridge, and said wire forming the fourth arm of said bridge, means for applying a voltage across a diagonal of said bridge, a variable resistor connected between two arms of the bridge for balancing said bridge for airfield altitude, and a meter connected across the other diagonal of said bridge through said variable resistor, whereby the changes in resistance of said wire due to the hydrogen flow through the palladium insert as aforesaid operates said meter to provide an indication of altitude.

6. A device for indicating altitude as a function of the hydrogen pressure existing in the atmosphere at a given altitude comprising, a palladium chamber, the exterior of said chamber being exposed to the atmosphere, indicating means associated with said chamber and responsive to the internal hydrogen pressure thereof to indicate altitude, and means for heating said chamber to thereby balance the internal hydrogen pressure of said chamber with the hydrogen pressure in the atmosphere.

7. An altimeter for indicating altitude as a function of the hydrogen pressure in the atmosphere comprising an evacuated envelope, a palladium insert forming a part of said envelope, the exterior of said insert communicating with the atmosphere, means for heating said palladium insert to permit hydrogen from the atmosphere to flow into and out of said envelope through said palladium insert to balance the hydrogen pressure in said envelope with the hydrogen pressure in the atmosphere, a filament, a grid and a plate within said envelope, an electrical circuit including a source of electrical energy in circuit with said filament, grid and plate aforesaid to ionize the hydrogen within said envelope, and whereby hydrogen ions thus formed are collected on said plate, and means connected in said circuit to indicate altitude as a function of the hydrogen ions collected on the plate as aforesaid.

8. An altimeter for indicating altitude as a function of the hydrogen density in the atmosphere comprising an evacuated envelope, an insert forming a portion of said envelope and formed of a metal having the property of becoming permeable only to hydrogen upon the heating thereof, means for heating said insert whereby the hydrogen density within said envelope is balanced with the hydrogen density of the atmosphere, an electrical circuit associated with said envelope and controlled by the hydrogen density within said envelope, comprising a filament, a grid and a plate arranged within said envelope, a source of electrical energy applied to said filament, grid and plate whereby said filament and grid cooperate to ionize the hydrogen within said envelope, and said grid and plate cooperate to collect the hydrogen ions thus formed on the plate, the quantity of hydrogen ions formed and collected on said plate being a function of the hydrogen density within said envelope, and a meter in said circuit to indicate the quantity of hydrogen ions collected on said plate, said meter being calibrated in terms of altitude whereby the quantity of hydrogen ions formed and collected on the plate as aforesaid due to the density of the hydrogen within said envelope is expressed in terms of altitude.

9. An altimeter for indicating altitude as a function of the hydrogen pressure in the atmosphere, comprising an evacuated envelope, a palladium insert forming a part of said envelope, the exterior of said insert communicating with the atmosphere, means for heating said palladium insert to permit hydrogen from the atmosphere to flow into and out of said envelope through said palladium insert to balance the hydrogen pressure in said envelope with the hydrogen pressure in the atmosphere, a filament, a grid and a plate within said envelope, a first electrical circuit including a source of electrical energy connected to said filament and grid to heat said filament and ionize the hydrogen within said envelope, a second electrical circuit including a source of electrical energy connected to said grid and plate to collect hydrogen ions formed in said envelope, and a meter connected in said second electrical circuit, said meter being responsive to the quantity of ions collected on said plate and calibrated to indicate altitude as a function of the hydrogen ions collected.

References Cited in the file of this patent
UNITED STATES PATENTS

| | | |
|---|---|---|
| 1,467,084 | Bassett | Sept. 4, 1923 |
| 2,166,104 | Collbohm | July 18, 1939 |
| 2,378,226 | Lee | June 12, 1945 |
| 2,400,940 | McCollum | May 28, 1946 |
| 2,456,163 | Watson | Dec. 14, 1948 |

FOREIGN PATENTS

| | | |
|---|---|---|
| 595,749 | France | July 24, 1925 |